US008807250B2

(12) United States Patent
Chen

(10) Patent No.: US 8,807,250 B2
(45) Date of Patent: Aug. 19, 2014

(54) POWERED SINGLE-WHEELED SELF-BALANCING VEHICLE FOR STANDING USER

(76) Inventor: Shane Chen, Camas, WA (US)

(*) Notice: Subject to any disclaimer, the term of this patent is extended or adjusted under 35 U.S.C. 154(b) by 296 days.

(21) Appl. No.: 13/044,487

(22) Filed: Mar. 9, 2011

(65) Prior Publication Data

US 2011/0220427 A1 Sep. 15, 2011

Related U.S. Application Data

(60) Provisional application No. 61/311,933, filed on Mar. 9, 2010, provisional application No. 61/315,020, filed on Mar. 18, 2010.

(51) Int. Cl.
*B62K 1/00* (2006.01)
*B62K 3/00* (2006.01)
*B62K 15/00* (2006.01)

(52) U.S. Cl.
CPC . *B62K 3/007* (2013.01); *B62K 1/00* (2013.01); *B62K 2015/003* (2013.01)
USPC ............................. 180/21; 180/6.58

(58) Field of Classification Search
CPC .... B62K 17/00; B62K 1/00; B62K 2015/003; B62K 3/007; B62D 61/00
USPC ......... 180/6.24, 6.5, 6.58, 65.51, 208, 21, 6.2
See application file for complete search history.

(56) References Cited

U.S. PATENT DOCUMENTS

| 3,306,626 | A | * | 2/1967 | Kawada | 280/205 |
|---|---|---|---|---|---|
| 4,109,741 | A | * | 8/1978 | Gabriel | 180/21 |
| 6,302,230 | B1 | | 10/2001 | Kamen | |
| 6,561,294 | B1 | * | 5/2003 | Kamen et al. | 180/21 |
| 7,303,032 | B2 | * | 12/2007 | Kahlert et al. | 180/65.1 |
| 7,543,834 | B2 | * | 6/2009 | Goczey et al. | 280/205 |
| 8,028,777 | B2 | * | 10/2011 | Kakinuma et al. | 180/65.1 |
| 8,219,308 | B2 | * | 7/2012 | Leeser | 701/124 |
| 2009/0266629 | A1 | * | 10/2009 | Simeray et al. | 180/65.51 |
| 2011/0067936 | A1 | * | 3/2011 | Takenaka et al. | 180/21 |
| 2011/0070997 | A1 | * | 3/2011 | Gomi et al. | 476/66 |
| 2012/0061156 | A1 | * | 3/2012 | Takenaka et al. | 180/21 |

* cited by examiner

*Primary Examiner* — Paul N Dickson
*Assistant Examiner* — Timothy Wilhelm

(57) ABSTRACT

A powered, gyroscopically balanced unicycle device to be used while standing, having leg contact surfaces which are made of a yielding, slightly soft material whose mild friction against the user's legs allows stable, precise control of the device without restraining the legs in any way. In one embodiment a single hubless wheel is driven by a friction drive mechanism which transmits torque from a motor through a drive wheel positioned below the foot platforms and in contact with the inner rim of the wheel. Various structures are provided for supporting the wheel and keeping it in place as it spins; absorbing small vertical movements of the wheel to prevent them from being transmitted to the foot platforms; enabling folding of the foot platforms; and facilitating carrying of the device by hand. Other embodiments are described and shown.

20 Claims, 7 Drawing Sheets

POWERED SINGLE-WHEELED SELF-BALANCING VEHICLE FOR STANDING USER

CROSS-REFERENCE TO RELATED APPLICATIONS

This application claims the benefit of provisional patent application Nos. 61/311,933 and 61/315,020 filed respectively on 2010 Mar. 9 and 2010 Mar. 18 by the present inventor.

FIELD OF THE INVENTION

The present invention relates to powered unicycles, and also to powered vehicles with gyroscopic self-balancing functionality.

BACKGROUND OF THE INVENTION

Examples in the prior art of electric-powered self-balancing vehicles for use while standing include those disclosed in U.S. Pat. No. 6,302,230 issued to Kamen et al. for Personal Mobility Vehicles and Methods (the '230 patent), and U.S. patent application Ser. No. 12/281,101 by Simeray for Motorized Transport Vehicle for a Pedestrian (the '101 application).

In a powered self-balancing unicycle, an electronic gyroscope that accelerates or decelerates the wheel in the appropriate direction is used to achieve fore-and-aft balance. This type of automatic fore-and-aft balance technology is taught in the '230 patent. A sensor and the electronic gyroscope equipment are provided. Position information detected by the sensor and the electronics is relayed to a motor. The motor drives the wheel in the appropriate direction and at sufficient speed to maintain fore-and-aft balance.

The '230 patent includes two-wheel and one-wheel embodiments, the two-wheel embodiment including the "Segway", a highly-publicized personal transport device having a user platform between (or above) two parallel wheels. Among the one-wheel embodiments in the '230 patent are some which, like the present invention, do not include a handle bar support by a shaft. However, since these do not provide any means for stabilizing the device with respect to the user's legs, they would require considerable skill to use, in addition to being difficult to control precisely.

It is greatly conducive to the comfort and safety of using the device if there is some means for stabilizing the device with respect to the user's legs, especially in situations where more precise control may be required, such as when mounting or dismounting, executing turns, passing over bumps in the riding surface, or keeping the device upright when ascending or descending a slope. Thus without specific considerations in the design of the vehicle for this purpose, this type of device would not be practical as a means of transportation.

The '101 application teaches a single wheel, coupled to a frame to which two platforms (one on each side of the wheel) are attached. One of the defining features of the '101 application is its "guide supports that tightly hold the user's legs". These guide supports are shown as brackets in the form of bars or cuffs which hold the legs at knee or calf level and restrict the range of forward or backward leaning of the legs relative to the wheel, thereby providing greater stability for the user. Many embodiments of the '101 application therefore generally meet the needs described above, since the user can press against the leg brackets for stability and for steering and tilting the device. However, the restraints imposed by the leg brackets introduce some inconvenience and, in some situations, danger in using the device, since when the user needs to dismount quickly the brackets may prevent him from doing so. There is therefore a need for an alternative means of achieving the same functions.

SUMMARY

The present inventor has discovered that all of the necessary functions performed by the leg brackets of the '101 patent can be analogously performed by means of special surfaces provided on the device, which come into contact with only the proximal sides of the user's knees and/or lower legs. These leg contact surfaces are formed from a material chosen so as to supply a mild friction against the legs. The contact surfaces furthermore protrude slightly from the sides of the device, to the extent that they come into contact with the legs while the user is standing in a natural upright stance with his feet upon the foot platforms. These features are necessary in order to make the device easy and comfortable to operate without the inclusion of any kind of leg or foot restraints. The possibility of this arrangement appears to have been previously overlooked in the prior art.

This represents an approach to controlling a standing, powered, single-wheeled vehicle that differs from that of the '101 application, in that the vehicle is controlled by gripping the device with the legs rather than by applying force to the front and back leg supports. Compared to embodiments of the '101 application, the present invention has advantages in safety and convenience, and is incidentally also less complex to manufacture. With regards to other similar devices in the rest of the prior art (of which the single-wheeled handle-less embodiments of the '230 patent are an example), the present invention is easier to use and offers more precise control.

DRAWINGS

DRAWINGS-List of Reference Numerals

Figure 1:
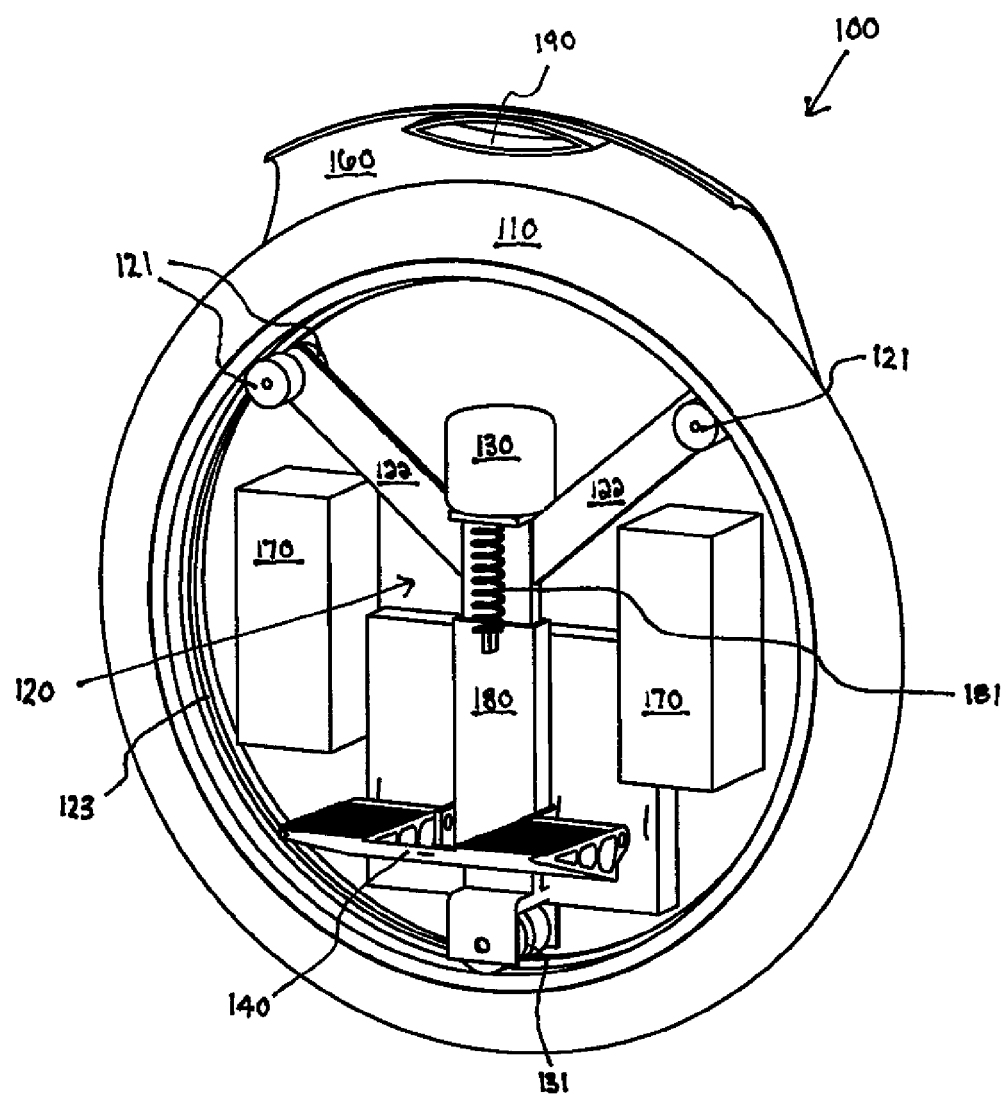
FIG. 1 shows a side view of a powered unicycle device having a hubless wheel, friction drive system, and suspension system, with one side of its casing removed.

| | |
|---|---|
| 100 | Unicycle device (FIGS. 1-3, 5) |
| 110 | Wheel |

-continued

| DRAWINGS-List of Reference Numerals | |
|---|---|
| 120 | Frame |
| 121 | Guide wheels |
| 122 | Guide wheel support members |
| 123 | Rib (on inner rim of wheel 110) |
| 130 | Motor |
| 131 | Drive wheel |
| 140 | Foot platforms-double |
| 141 | Cavity (for receiving foot platform) |
| 150 | Leg contact surfaces |
| 160 | Casing |
| 170 | Battery or batteries |
| 180 | Sliding component |
| 181 | Spring |
| 190 | Carrying handle |
| 200 | Unicycle device (FIG. 4) |
| 210 | Wheel |
| 240 | Foot platform-single |
| 300 | Unicycle device (FIGS. 6-7) |
| 350 | Leg contact surfaces-adjustable |
| 360 | Casing |
| 400 | Unicycle device (FIG. 8) |
| 440 | Foot platforms-one piece with casing |
| 460 | Casing |

DETAILED DESCRIPTION

FIG. 1 shows one embodiment of a powered unicycle device 100, with one side of the casing 160 removed. A single wheel 110 spins around a frame 120. Frame 120 includes guide wheels 121 attached to the ends of respective guide wheel support members 122. In this embodiment there are two pairs of guide wheels 121, wherein the two guide wheels in each pair share the same axle and are positioned on opposite sides of their respective guide wheel support member 122. A slightly extruded rib 123 is provided on the inner rim of wheel 110 and fits into the gap between the two guide wheels 121 in each pair. (Other arrangements, including those with more than one guide wheel support member, and those with only one guide wheel per support member, are possible.) Guide wheels 121 are therefore in contact with the inner rim of wheel 110 where they spin along with wheel 110 and hold wheel 110 in place by way of rib 123.

On frame 120 is mounted a motor 130, which directly drives a drive wheel 131 coupled to the frame 120 and positioned at the lowermost point along the inner rim of wheel 110. Like guide wheels 121, drive wheel 131 is in contact with the inner rim of wheel 110. In this embodiment drive wheel 131 consists of a wide roller with a groove in the center into which rib 123 fits. By way of its contact with wheel 110, drive wheel 131 transmits torque from motor 130 to wheel 110. Since this drive system operates by friction, drive wheel 131 and the inner rim of wheel 110 must be pressed together with enough force to prevent slippage. With drive wheel 131 positioned directly beneath foot platforms 140, the weight of the user provides the needed force.

One possible variation on the hubless drive system described above is one based on gear transmission instead of friction. The drive wheel is replaced by a gear, and accordingly the inner rim of the wheel has alternating protruding and indented segments ("teeth").

A casing 160 encloses part or most of the device 100. The two foot platforms 140 are coupled to casing 160, with one on each side of wheel 110. The user stands with one foot on each platform and faces toward the direction of travel of wheel 110. A gyroscope system is associated with motor 130; it senses forward and backward tilt of frame 120 in relation to the ground and regulates the motor accordingly to keep frame 120 upright. This provides a means for controlling the acceleration and deceleration of the vehicle by leaning forward or backward, and also enables the vehicle to self-regulate its balance in the fore-and-aft plane.

In addition to being fixed to casing 160, foot platforms 140 are also coupled to a sliding component 180, which in this embodiment is formed as a hollow extruded rectangle capable of sliding along a substantially vertical path. A spring (or springs) 181 is attached to some part of frame 120 and to sliding component 180. The two batteries 170 that supply power to motor 130 are rigidly affixed to casing 160. (In this embodiment there are two batteries in order to create a balanced distribution of volume and weight, but there need not necessarily be two.) Casing 160, foot platforms 140, sliding component 180, and batteries 170 can move vertically together as a unit, relative to frame 120, wheel 110, and all associated structures, while spring 181 biases the entire arrangement to a certain neutral position. In practice, the weight of the batteries and of the user cause the foot platforms, etc. to be less affected by bumps in the riding surface than the much lighter wheel and frame are, so that the wheel and frame lift over bumps while the structures supporting the user remain relatively stable. A space is provided in the top of casing 160 so that wheel 110 has room to lift upward. The overall effect is of a suspension or shock absorption system which increases comfort, ease of use, and safety for the user. This is significant for the viability of the device as a realistic means of transportation.

Figure 2:
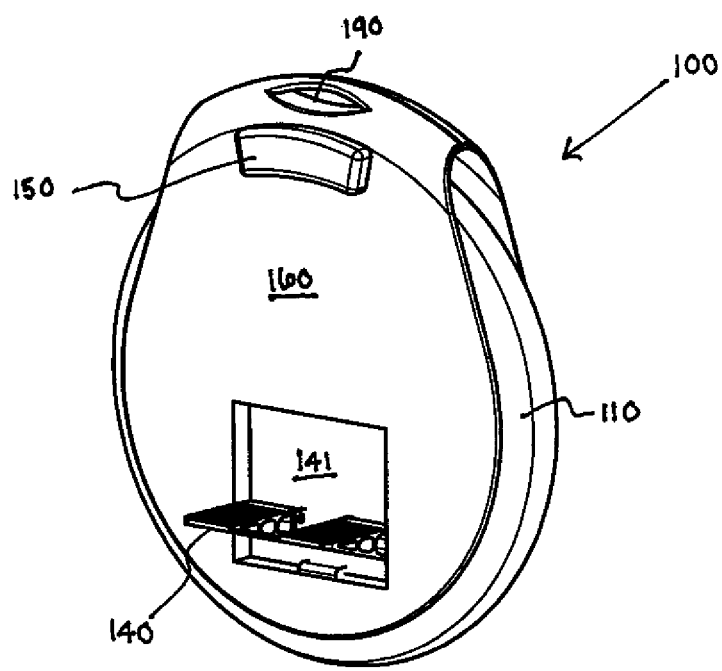
FIG. 2 shows the unicycle device of FIG. 1 with entire casing present, leg contact surfaces, carrying handle, and two foldable foot platforms in unfolded position.
Figure 3:
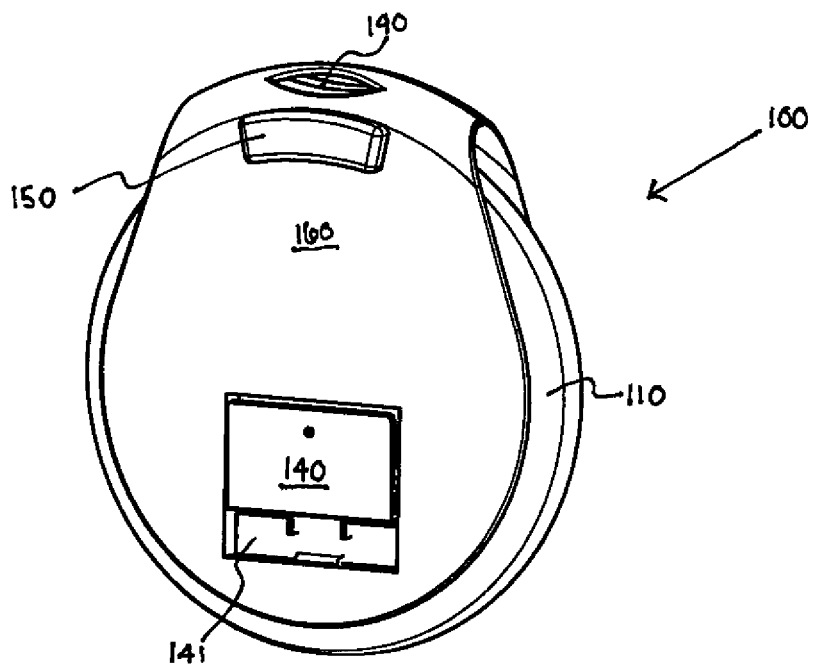
FIG. 3 shows the unicycle device of FIG. 2 with the two foldable foot platforms in folded position.

FIGS. 2 and 3 show the powered unicycle device 100 of FIG. 1, with the entire casing 160 present. Leg contact surfaces 150 protrude outward from the sides of casing 160 at a height where they may be in contact with the knees and/or upper calves of the user. The protrusion of leg contact surfaces 150 from the main body of casing 160 allows them to reach the user's legs when the user has her feet on foot platforms 140 and is standing in a natural upright position. Leg contact surfaces 150 are made of a yielding, slightly soft material, such as rubber. These features of leg contact surfaces 150 cause them to provide friction against the user's legs, thereby enabling the use of the user's legs to easily hold the device in place during use. This is important for stability, comfort, and ease of use, and is needed especially in situations where more precise control may be required, such as for instance when mounting or dismounting, executing turns, passing over bumps in the riding surface, and keeping the device upright when ascending or descending a slope. (It is also helpful for new users who are learning to use the device.)

Foot platforms 140, coupled to casing 160, are articulated so as to be upwardly foldable into a stowed position that narrows the profile of the device to aid in storage and carrying. A cavity 141 is provided on each side of casing 160 and is of suitable shape and depth for receiving foot platforms 140 in folded position.

FIGS. 2 and 3 also show a carrying handle 190 formed as part of casing 160, above wheel 110. Since this embodiment includes the suspension system described above, the handle may be cut into the abovementioned hollow space provided in the top of casing 160.

Figure 4:
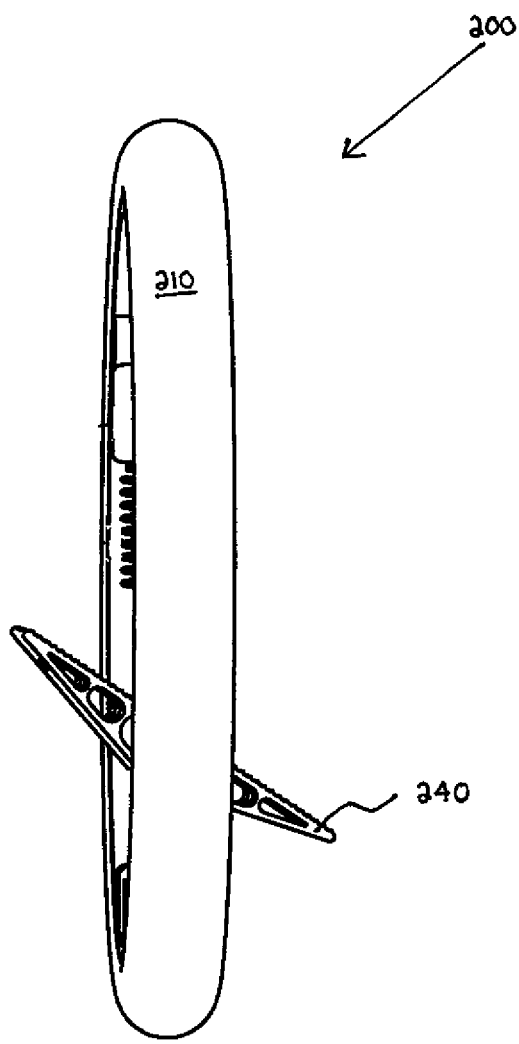
FIG. 4 shows a front (or back) perspective view of another embodiment of a powered unicycle device having a single foot platform in transition between folded and unfolded position, with the entire casing removed.

FIG. 4 shows another embodiment of the present invention, with the casing removed. Unicycle device 200 is slightly different from unicycle device 100 of FIGS. 1-3 in that there is a single foot platform 240, which extends on both sides of wheel 210 and therefore acts the same as the double foot platforms 140 when in use. However, since foot platform 240 is a single rigid body, it folds for storage and carrying by tilting ninety degrees to one side (so that its profile is no wider than that of wheel 210). The other components of unicycle device 200 are arranged in a way that provides a gap which receives foot platform 240 in folded position. In this illustration foot platform 240 is shown in transition between folded and unfolded position.

Figure 5:
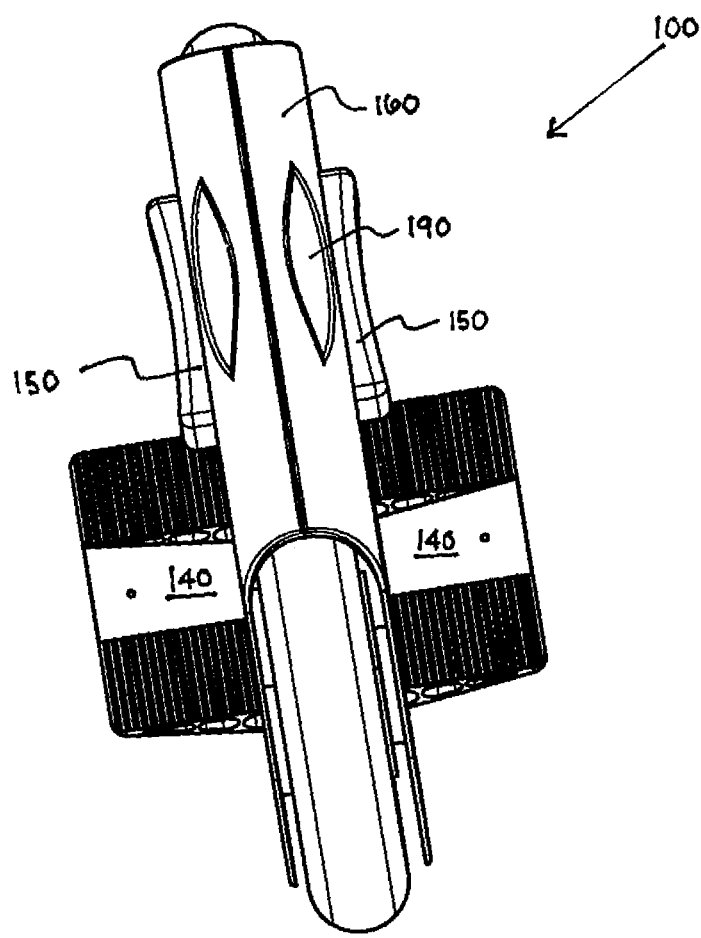
FIG. 5 shows a perspective top profile view of the unicycle device of FIGS. 1-3, illustrating the slight concave curvature of the leg contact surfaces.

The embodiment shown in FIG. 5 may be either the embodiment of FIGS. 1-3 or the embodiment of FIG. 4. FIG. 5 shows that in this particular embodiment leg contact surfaces 150 bear a very slight concave curvature. This curvature approximately fits the user's knees or legs and can be an additional factor in providing a means by which the user may have easy, precise control of the device without resorting to any kind of leg restraint.

Figure 6:
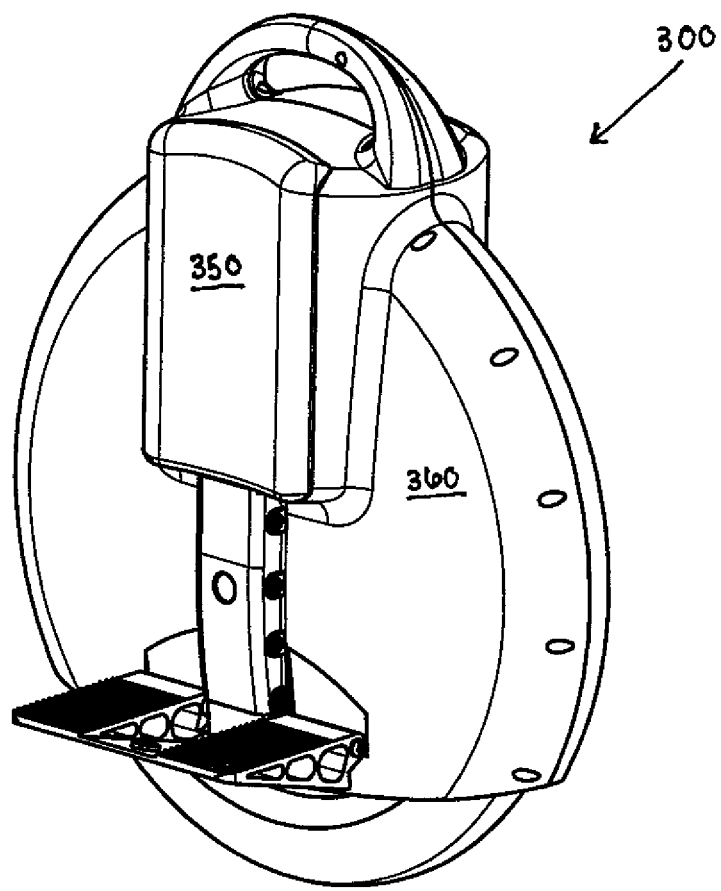
FIG. 6 shows a significantly different embodiment of a powered unicycle device with taller leg contact surfaces which are also adjustable.

FIG. 6 shows another embodiment of a powered unicycle device 300 in accordance with the present invention. This embodiment is significantly different from unicycle devices 100 and 200 in that the wheel is not hubless, and accordingly is driven by a hub motor (a type of motor which is known in the art). This embodiment is also illustrative of another possible shape of leg contact surfaces 350, which can keep contact with a large area of the user's lower leg; and a casing 360 which encloses a greater portion of the device than that of the embodiments shown in FIGS. 1-5.

Figure 7:
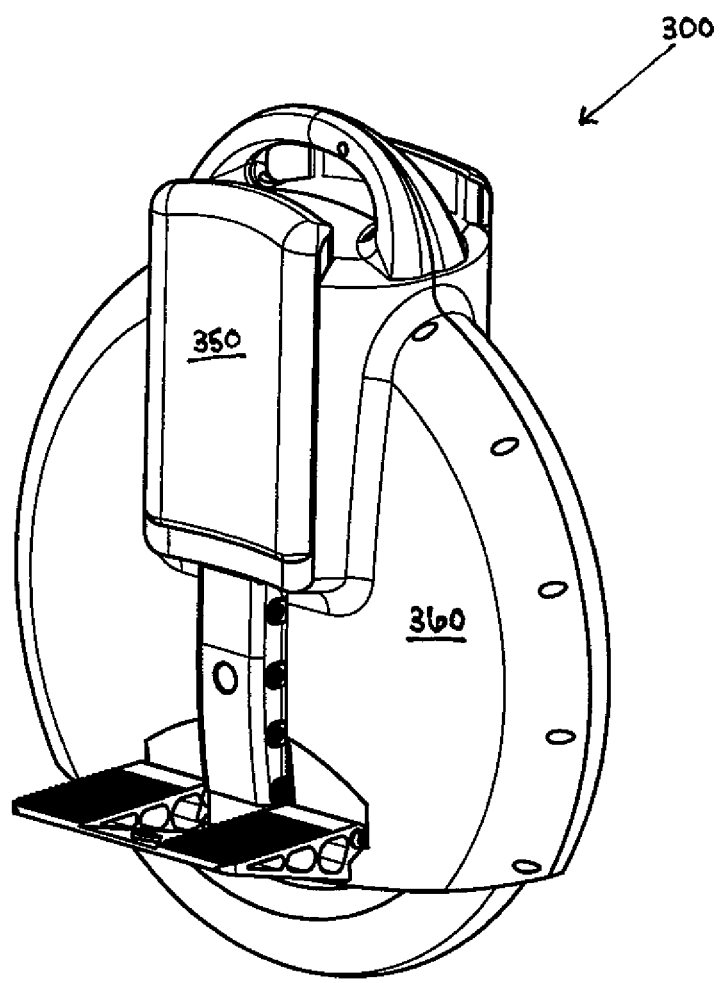
FIG. 7 shows the unicycle device of FIG. 6 with the leg contact surfaces slightly raised.

FIG. 7 shows the unicycle device 300 of FIG. 6, wherein leg contact surfaces have been moved upward. The leg contact surfaces of this embodiment are configured so as to be capable of being raised and lowered in order to accommodate different possible heights and leg lengths of users. This adjustable leg contact surface is also applicable to many other embodiments besides this one.

Figure 8:
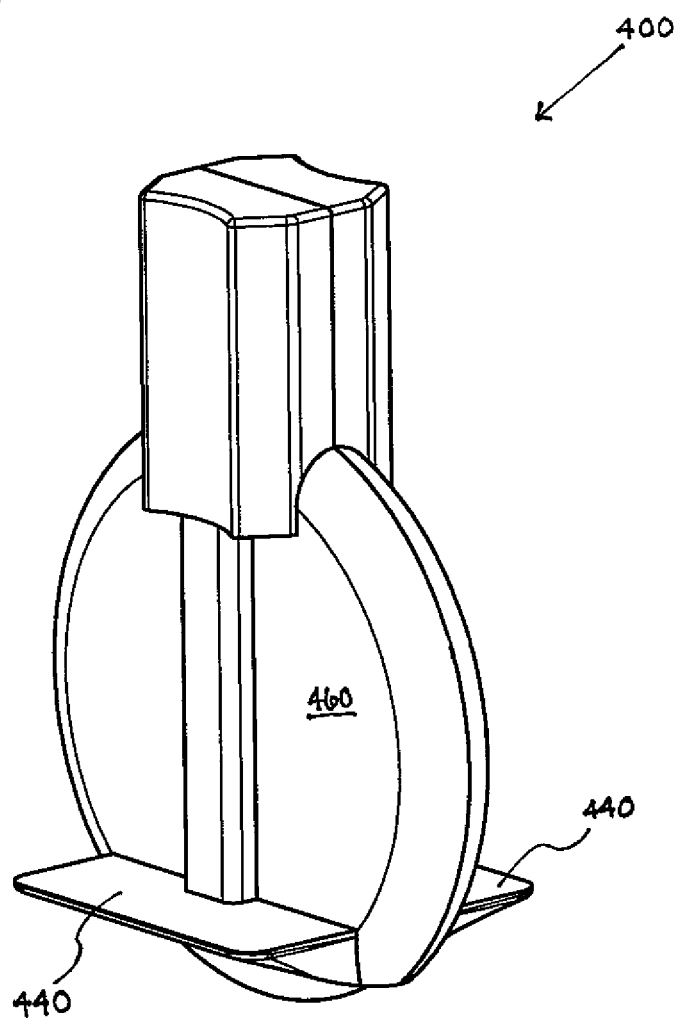
FIG. 8 shows another embodiment of a powered unicycle device having two foot platforms rigidly molded together with the casing.

FIG. 8 shows another embodiment of a powered unicycle device 400 having two foot platforms 440, one rigidly affixed to each side of the wheel. Foot platforms 440 may be formed together with casing 460 from the same piece of material. Unicycle device 400 also has different implementation of leg contact surfaces 450 wherein they extend above the main body of the device.

Any embodiment of the present invention may further comprise means for detecting when the vehicle is turning—such as by detecting the sideways tilt which generally occurs during turning—and automatically adjusting the vehicle's speed and/or pitch (the angle of tilt in fore-and-aft dimension) to accommodate the turn. Without such means, small-radius turns may be difficult to execute, or may feel awkward or uncomfortable for the rider. For example, the rider may tend to bend his knees slightly during a turn, which can result in his lower legs angling forward. This may cause the vehicle to accelerate as an unwanted side effect. By tipping forward and/or decelerating slightly for the duration of the turn, the vehicle can compensate for the change in the rider's stance.

As shown in FIGS. 2 and 5-8, the foot platforms 140,440 extend in a direction perpendicular to a central vertical plane of the wheel to a greater extent than the leg contact surfaces 150,350 extend in that direction. In FIG. 5, it can be seen that the foot platforms extend twice as much or more than the leg contact surfaces from the central vertical plane.

Although the description above contains many specificities, these should not be construed as limiting the scope of the embodiments but as merely providing illustrations of some of the presently preferred embodiments. Thus the scope of the embodiments should be determined by the appended claims and their legal equivalents, rather than by the examples given.

The invention claimed is:

1. A powered unicycle device, comprising:
   a single wheel having an axis of rotation and defining a central vertical plane in the line of direction of travel that is rotatably coupled to a seatless frame;
   a motor which drives the wheel;
   an electronic fore-and-aft balance control system which controls said motor;
   first and second foot platforms coupled to the frame and each having a standing surface that is below the axis of rotation of the wheel;
   a first leg contact surface that in its entirety extends substantially longitudinally in the line of travel of the device and is configured to be readily contactable by the side of a user's leg, at or below the knee, when that user is standing on the first foot platform; and
   a second leg contact surface that in its entirety extends substantially longitudinally in the line of travel of the device and is configured to be readily contactable by the side of a user's leg, at or below the knee, when that user is standing on the second foot platform;
   wherein the first and second foot platforms extend in a direction perpendicular to the central vertical plane of the wheel further than the contact surfaces extend perpendicular to the central vertical plane, and further wherein the leg contact surfaces are configured so as to not substantially encircle a user's leg.

2. The powered unicycle device of claim 1, wherein said leg contact surfaces are adjustable to different heights.

3. The powered unicycle device of claim 1, wherein the first and second foot platforms extend substantially two times or more further than the contact surfaces from the central vertical plane.

4. The powered unicycle device of claim 1, wherein said leg contact surfaces include a yielding material.

5. The powered unicycle device of claim 1, wherein the longitudinally extending first and second leg contact surfaces extend from their front to back in the line of travel of the device two or more times further than they extend in a dimension perpendicular to the central vertical plane of the wheel.

6. The powered unicycle device of claim 1, wherein said wheel is hubless and the device further comprises at least two guide wheels, coupled to said frame, which contact an inner rim of the wheel and thereby hold the wheel in place as it spins.

7. The powered unicycle device of claim 1, wherein the single wheel defines first and second side planes that are parallel with and symmetric about the central vertical plane and respectively touch a first exterior side and a second exterior side of the wheel; and
   wherein the first and second foot platforms extend from the first and second vertical planes, respectively, in a direction perpendicular thereto a distance that is greater than the corresponding first and second contact surfaces extend in that direction.

8. The powered unicycle device of claim 7, wherein the first and second foot platforms extend a distance from the first and second vertical planes, respectively, that is two times or more the distance that the first and second contact surfaces respectively extend from those planes.

9. The powered unicycle device of claim 1, wherein the longitudinally extending first and second leg contact surfaces extend from their front to back in the line of travel of the device three or more times further than they extend in a dimension perpendicular to the central vertical plane of the wheel.

10. The powered unicycle device of claim 1, further comprising a drive wheel directly driven by the motor and in contact with an inner rim of the wheel, wherein the drive wheel transmits torque to the wheel by means of friction between the drive wheel and the inner rim of the wheel, and wherein the drive wheel is positioned beneath the foot platforms.

11. The powered unicycle device of claim 1, further comprising a handle at the top of the frame, above the wheel, for carrying the device.

12. A powered unicycle device, comprising:
a single wheel rotatably coupled to a frame;
a motor which drives said wheel;
an electronic fore-and-aft balance control system which controls said motor;
first and second foot platforms coupled to said frame; and
first and second leg contact surfaces disposed outwardly on the frame; and
further comprising a means for allowing said wheel to undergo small vertical displacements relative to said foot platform while biased toward a certain neutral position, thereby absorbing the effect of bumps in the riding surface.

13. A powered unicycle device, comprising:
a single wheel rotatably coupled to a frame;
a motor which drives said wheel;
an electronic fore-and-aft balance control system which controls said motor;
first and second foot platforms coupled to said frame; and
first and second leg contact surfaces disposed outwardly on the frame; and
further comprising means for automatically adjusting speed while executing a turn.

14. The unicycle device of claim 13, wherein the leg contact surfaces are configured to contact the sides of a user's leg at or below the knee.

15. A powered unicycle device, comprising:
a single wheel rotatably coupled to a frame;
a motor which drives said wheel;
an electronic fore-and-aft balance control system which controls said motor;
first and second foot platforms coupled to said frame; and
first and second leg contact surfaces disposed outwardly on the frame;
a sideways lean sensor; and
means for automatically adjusting fore-aft pitch while executing a turn in response to detection of sideways leaning of the vehicle.

16. The unicycle device of claim 15, wherein the first and second leg contact surfaces are positioned above the first and second platforms, respectively, and each have a maximum length dimension parallel to the central vertical plane of the wheel that is greater than a maximum width dimension perpendicular to that plane so that in use it is the side of a user's leg more than the front or back thereof that contacts the leg contact members to control the unicycle device.

17. The unicycle device of claim 15, wherein the leg contact surfaces are configured to contact the sides of a user's leg at or below the knee.

18. A powered unicycle device, comprising:
a single wheel rotatably coupled to a seatless frame, the single wheel defining first and second side planes that are parallel with and symmetric about a central vertical plane of the wheel and respectively touch a first exterior side and a second exterior side of the wheel;
a motor which drives the wheel;
an electronic fore-and-aft balance control system which controls the motor;
first and second foot platforms;
first and second leg contact members that each, in its entirety, extends substantially longitudinally in the line of travel of the device and is configured to be readily contactable by the side of a user's leg, at or below the knee, when that user is standing on the foot platforms; and
wherein the first and second foot platforms extend from the first and second vertical planes, respectively, in a direction perpendicular thereto a distance that is greater than the corresponding first and second contact members extend in that direction, and further wherein the leg contact members are configured so as to not substantially encircle a user's leg.

19. The unicycle device of claim 18, wherein the first and second foot platforms extend a distance from the first and second vertical planes, respectively, that is two times or more the distance that the first and second contact members respectively extend from those planes.

20. The unicycle device of claim 18, wherein the foot platforms, frame and contact members are configured for a user to achieve turning and control of the vehicle with the user's feet and lower legs and without a vertically ascending control handle.

* * * * *